United States Patent
Ishitani et al.

(10) Patent No.: US 9,239,497 B2
(45) Date of Patent: Jan. 19, 2016

(54) METHOD FOR MANUFACTURING LIQUID CRYSTAL DISPLAY DEVICE

(75) Inventors: Tetsuji Ishitani, Kanagawa (JP); Daisuke Kubota, Kanagawa (JP); Tomohiro Tamura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 548 days.

(21) Appl. No.: 12/785,797

(22) Filed: May 24, 2010

(65) Prior Publication Data

US 2010/0326592 A1 Dec. 30, 2010

(30) Foreign Application Priority Data

May 29, 2009 (JP) ................................. 2009-131121

(51) Int. Cl.
- B29C 65/02 (2006.01)
- B32B 37/06 (2006.01)
- B32B 38/04 (2006.01)
- G02F 1/1341 (2006.01)
- G02F 1/1339 (2006.01)
- G02F 1/137 (2006.01)

(52) U.S. Cl.
CPC ............. *G02F 1/1341* (2013.01); *G02F 1/1339* (2013.01); *G02F 2001/13415* (2013.01); *G02F 2001/13793* (2013.01); *Y10T 156/1052* (2015.01)

(58) Field of Classification Search
CPC .................... G02F 1/1341; G02F 2001/13415; G02F 2001/13793; Y10T 156/1052; B32B 38/0004

USPC .......... 156/250, 252, 253, 272.2, 272.3, 272.5
See application file for complete search history.

(56) References Cited

U.S. PATENT DOCUMENTS

| | | | |
|---|---|---|---|
| 5,517,344 A | 5/1996 | Hu et al. | |
| 6,137,559 A | 10/2000 | Tanaka et al. | |
| 6,222,603 B1 | 4/2001 | Sakai et al. | |

(Continued)

FOREIGN PATENT DOCUMENTS

| CN | 001886437 A | 12/2006 |
|---|---|---|
| CN | 101295109 A | 10/2008 |

(Continued)

OTHER PUBLICATIONS

Machine Translation of JP 2003-327966.*

(Continued)

*Primary Examiner* — Mark A Osele
*Assistant Examiner* — Christopher C Caillouet
(74) *Attorney, Agent, or Firm* — Fish & Richardson P.C.

(57) ABSTRACT

It is an object to provide a method for manufacturing a liquid crystal display device including a liquid crystal layer which exhibits a stable blue phase. The following steps are performed: a first step of forming a thermosetting first sealant so as to form a frame over a first substrate; a second step of forming a photocurable and thermosetting second sealant on an outer side than the first sealant over the first substrate; a third step of dropping a liquid crystal material which exhibits a blue phase at a given temperature on an inner side than the first sealant; a fourth step of attaching a second substrate to the first substrate in a reduced-pressure atmosphere; a fifth step of performing polymer stabilization treatment on the liquid crystal material; and a sixth step of curing the first sealant through heat treatment.

14 Claims, 13 Drawing Sheets

(56) References Cited

U.S. PATENT DOCUMENTS

| | | |
|---|---|---|
| 6,573,972 B2 | 6/2003 | Sasaki |
| 6,831,725 B2 | 12/2004 | Niiya |
| 7,193,678 B2 | 3/2007 | Ueyama |
| 7,327,433 B2 | 2/2008 | Miyachi et al. |
| 7,576,829 B2 | 8/2009 | Kikuchi et al. |
| 7,623,215 B2 | 11/2009 | Motomatsu |
| 7,728,948 B2 | 6/2010 | Nishi |
| 7,876,401 B2 | 1/2011 | Hsieh et al. |
| 8,269,943 B2 | 9/2012 | Nishi |
| 2003/0076473 A1 | 4/2003 | Sasaki |
| 2004/0160566 A1 | 8/2004 | Kawabe et al. |
| 2005/0122465 A1 | 6/2005 | Togashi |
| 2006/0132696 A1 | 6/2006 | Chen et al. |
| 2006/0203169 A1 | 9/2006 | Ozawa et al. |
| 2006/0227283 A1 | 10/2006 | Ooi et al. |
| 2007/0095468 A1 | 5/2007 | Kim et al. |
| 2007/0096056 A1* | 5/2007 | Takeuchi et al. ......... 252/299.01 |
| 2008/0259254 A1 | 10/2008 | Kikuchi et al. |
| 2008/0266509 A1 | 10/2008 | Nishi et al. |
| 2009/0153761 A1 | 6/2009 | Park et al. |
| 2009/0322997 A1 | 12/2009 | Kaihoko et al. |
| 2010/0022745 A1 | 1/2010 | Takeuchi |
| 2010/0039605 A1 | 2/2010 | Zhao et al. |
| 2010/0195028 A1 | 8/2010 | Kubota et al. |
| 2010/0245724 A1 | 9/2010 | Nishi et al. |
| 2010/0328565 A1 | 12/2010 | Kubota et al. |
| 2011/0080541 A1 | 4/2011 | Hsieh et al. |
| 2012/0307188 A1 | 12/2012 | Nishi |

FOREIGN PATENT DOCUMENTS

| | | |
|---|---|---|
| JP | 07-084254 A | 3/1995 |
| JP | 10-177178 A | 6/1998 |
| JP | 2001-174829 A | 6/2001 |
| JP | 2001-183640 A | 7/2001 |
| JP | 2003-327966 A | 11/2003 |
| JP | 2005-221944 A | 8/2005 |
| JP | 2006-201276 A | 8/2006 |
| JP | 2007-199710 A | 8/2007 |
| JP | 2008-216679 A | 9/2008 |
| TW | 200624962 | 7/2006 |
| TW | 200919043 | 5/2009 |

OTHER PUBLICATIONS

Chinese Office Action (Application No. 201010197683.6) dated Nov. 29, 2013, with Full Translation.

Taiwanese Office Action (Application No. 099117033) Dated Mar. 2, 2015.

* cited by examiner

FIG. 6A1  FIG. 6A2

METHOD FOR MANUFACTURING LIQUID CRYSTAL DISPLAY DEVICE

BACKGROUND OF THE INVENTION

1. Field of the Invention

The present invention relates to a liquid crystal display device and a method for manufacturing the liquid crystal display device.

2. Description of the Related Art

In recent years, display devices (flat panel display) which are very thin and lightweight as compared to cathode-ray tube display devices have developed. The flat panel displays include liquid crystal display devices which have liquid crystal elements, electro-luminescent (EL) display devices which have self-light emitting elements such as EL elements, plasma displays, and the like, and they are in competition in the market.

Although each kind of flat panel display has good points and bad points as of now, the liquid crystal display devices are inferior to the other flat panel displays in the response time of an element (the speed of switching the display). Various techniques for overcoming the disadvantage in the response time have been proposed so far. A conventional liquid crystal element which employs a driving method of a liquid crystal called a twisted nematic (TN) mode has a response time of approximately 10 milliseconds, whereas a liquid crystal element which employs an optical compensated birefringence (OCB) mode or a ferroelectric liquid crystal (FLC) mode has realized an improved response time of approximately 1 millisecond (see Patent Document 1, for example).

Another technique which attracts as much attention as such a driving method of a liquid crystal uses a state called a blue phase for a liquid crystal display element. The blue phase is a liquid crystal phase which appears between a chiral nematic phase having a relatively short spiral pitch and an isotropic phase, and has a feature of an extremely short response time. The liquid crystal display element using a liquid crystal layer which exhibits the blue phase does not need to have an orientation film and can widen a viewing angle and thus is expected to be put into practical use. However, the blue phase is exhibited in a small temperature range of 1° C. to 3° C. between a cholesteric phase and an isotropic phase. Thus, there is a problem in that the temperature of the element needs to be controlled precisely.

In order to solve this problem, it is proposed that the temperature range of the blue phase be widened by polymer stabilization treatment (see Patent Document 2, for example). The polymer stabilization treatment is performed in such a manner that a photocurable resin is mixed into a liquid crystal material and light irradiation is performed at a temperature at which the blue phase is exhibited.

REFERENCES

Patent Documents

[Patent Document 1] Japanese Published Patent Application No. H07-084254

[Patent Document 2] Japanese Published Patent Application No. 2003-327966

SUMMARY OF THE INVENTION

In the case where a liquid crystal display device is manufactured using a liquid crystal dropping method (one drop fill (ODF) method), it is desirable that a sealant with a high viscosity be used in order to keep adhesion between substrates after attachment (to keep a vacuum state in a sealant area). In general, polymer stabilization treatment is performed in such a manner that with the use of a photocurable and thermosetting sealant with a high viscosity, a substrate on which a liquid crystal is dropped is attached to another substrate in a reduced-pressure atmosphere, the sealant is then irradiated with ultraviolet rays to be pre-cured, and then heat treatment is performed to post-cure the sealant and a liquid crystal material is irradiated with ultraviolet rays:

However, in the case where a photocurable and thermosetting sealant is irradiated with ultraviolet rays to be pre-cured before polymer stabilization treatment, a liquid crystal material which is formed on an inner side than the sealant is also irradiated with ultraviolet rays. Accordingly, polymer stabilization treatment is performed when the liquid crystal material exhibits a phase at a room temperature. For example, in the case where the liquid crystal material exhibits a cholesteric phase at a room temperature, polymer stabilization treatment is performed on a part of the liquid crystal material which is irradiated with ultraviolet rays in a cholesteric phase. Therefore, there is a problem in that a liquid crystal layer which exhibits a stable blue phase cannot be formed.

In addition, at this time, even in the case where a light shielding mask is formed to prevent the liquid crystal material from being irradiated with ultraviolet rays, there is a concern that the liquid crystal material might be irradiated with light reflected from wirings formed over a substrate and the like.

On the other hand, in the case where polymer stabilization treatment is performed on a liquid crystal material before a photocurable and thermosetting sealant is irradiated with ultraviolet rays, the viscosity of the sealant is reduced due to increase in the temperature in the polymer stabilization treatment, which causes a problem in that the width of the sealant which is in contact with the liquid crystal material is increased.

It is an object of an embodiment of the disclosed invention to provide a liquid crystal display device including a liquid crystal layer which exhibits a stable blue phase. It is another object of an embodiment of the disclosed invention to provide a liquid crystal display device in which even when polymer stabilization treatment is performed, in the case of employing a liquid crystal dropping method using a photocurable and thermosetting sealant, increase in the width of the sealant for sealing a liquid crystal material is suppressed, and a liquid crystal layer which exhibits a stable blue phase is included. In addition, it is another object of an embodiment of the disclosed invention to provide a liquid crystal display device including a liquid crystal layer capable of high-speed response.

An embodiment of the disclosed invention is that when a liquid crystal display device including a blue phase liquid crystal layer is manufactured using a liquid crystal dropping method (an ODF method), irradiation of a liquid crystal material with unintended light before polymer stabilization treatment is performed on a liquid crystal layer is suppressed.

Another embodiment of the disclosed invention includes: a first step of forming a thermosetting first sealant so as to form a frame over a first substrate; a second step of forming a photocurable and thermosetting second sealant on an outer side than the first sealant over the first substrate; a third step of dropping a liquid crystal material on an inner side than the first sealant; a fourth step of attaching a second substrate to the first substrate in a reduced-pressure atmosphere; a fifth step of performing polymer stabilization treatment on the liquid crystal material; and a sixth step of curing the first sealant through heat treatment. Note that another step may be included in a period between the first step and the sixth step.

Another embodiment of the disclosed invention includes: a first step of forming a thermosetting first sealant so as to form a frame over a first substrate; a second step of forming a photocurable and thermosetting second sealant on an outer side than the first sealant over the first substrate; a third step of dropping a liquid crystal material on an inner side than the first sealant; a fourth step of attaching a second substrate to the first substrate in a reduced-pressure atmosphere; a fifth step of curing the first sealant through heat treatment; and a sixth step of performing polymer stabilization treatment on the liquid crystal material. Note that another step may be included in a period between the first step and the sixth step.

Another embodiment of the disclosed invention includes: a first step of forming a photocurable and thermosetting sealant so as to form a frame over a first substrate; a second step of pre-curing the sealant through irradiation with ultraviolet rays; a third step of dropping a liquid crystal material on an inner side than the sealant; a fourth step of attaching a second substrate to the first substrate in a reduced-pressure atmosphere; a fifth step of performing polymer stabilization treatment on the liquid crystal material; and a sixth step of post-curing the sealant through heat treatment. Note that another step may be included in a period between the first step and the sixth step.

Another embodiment of the disclosed invention includes: a first step of forming a photocurable and thermosetting sealant so as to form a frame over a first substrate; a second step of pre-curing the sealant through irradiation with ultraviolet rays; a third step of dropping a liquid crystal material on an inner side than the sealant; a fourth step of attaching a second substrate to the first substrate in a reduced-pressure atmosphere; a fifth step of post-curing the sealant through heat treatment; and a sixth step of performing polymer stabilization treatment on the liquid crystal material. Note that another step may be included in a period between the first step and the sixth step.

According to an embodiment of the disclosed invention, a material which exhibits a blue phase at a given temperature is used as the liquid crystal material.

According to another embodiment of the disclosed invention, the polymer stabilization treatment can be performed in such a manner that heat treatment is performed so that the temperature of the liquid crystal material is set to a temperature at which the liquid crystal material exhibits a blue phase, and then the liquid crystal material is irradiated with ultraviolet rays. Alternatively, the polymer stabilization treatment may be performed in such a manner that heat treatment is performed so that the temperature of the liquid crystal material is set to a temperature within +5° C. of a phase transition temperature between a blue phase and an isotropic phase, at which the liquid crystal material exhibits an isotropic phase, and then the liquid crystal material is irradiated with ultraviolet rays.

Note that a liquid crystal display device in this specification means an image display device, a display device, or a light source (including a lighting device). Furthermore, the liquid crystal display device also includes all of the following modules in its category: a module to which a connector such as a flexible printed circuit (FPC), a tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by a chip on glass (COG) method.

According to another embodiment of the disclosed invention, a photocurable and thermosetting second sealant is formed on an outer side than a thermosetting first sealant and made to serve for improvement of adhesion between substrates, whereby irradiation with ultraviolet rays for pre-curing the second sealant is not needed. Accordingly, a liquid crystal display device including a liquid crystal layer which exhibits a stable blue phase can be manufactured. Moreover, even in the case where polymer stabilization treatment is performed before the photocurable and thermosetting second sealant is irradiated with ultraviolet rays, when a thermosetting sealant is used as the first sealant which is in contact with the liquid crystal layer and the photocurable and thermosetting second sealant is formed on an outer side than the first sealant, adhesion between the substrates can be kept and increase in the width of the sealant which is in contact with the liquid crystal layer can be suppressed.

According to another embodiment of the disclosed invention, even when a liquid crystal dropping method is performed using a photocurable and thermosetting sealant, the sealant is irradiated with ultraviolet rays to be pre-cured before formation of the liquid crystal material, whereby the liquid crystal material can be prevented from being irradiated with unintended light. Accordingly, a liquid crystal display device including a liquid crystal layer which exhibits a stable blue phase can be manufactured.

BRIEF DESCRIPTION OF THE DRAWINGS

In the accompanying drawings:

FIGS. 6A1 and 6A2 and FIG. 6B are views illustrating examples of structures of liquid crystal display devices;

DETAILED DESCRIPTION OF THE INVENTION

Figure 1A:
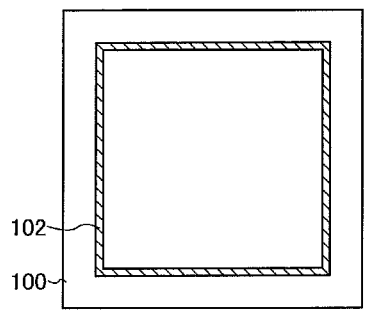
FIGS. 1A to 1F are views illustrating an example of a method for manufacturing a liquid crystal display device.

Embodiments of the present invention will be described below with reference to the accompanying drawings. Note that the present invention is not limited to the following description of the embodiments, and it is readily appreciated by those skilled in the art that modes and details of the present invention can be modified in a variety of ways without departing from the scope and spirit of the present invention. Accordingly, the present invention should not be interpreted as being limited to the following description of the embodiments. Further, structures according to different embodiments can be implemented in combination as appropriate. Note that in the structure of the present invention described below, reference numerals indicating the same portions and portions having a similar function are used in common in different drawings, and repeated descriptions thereof are omitted.

Embodiment 1

In this embodiment, an example of a method for manufacturing a liquid crystal display device is described with reference to drawings.

First, a first substrate 100 is prepared, and a first sealant 102 is formed over the first substrate 100 (see FIG. 1A).

As the first substrate 100, glass substrates used for electronics industry (also called a "non-alkali glass substrate") such as an aluminosilicate glass substrate, an aluminoborosilicate glass substrate, or a barium borosilicate glass substrate; a quartz substrate; a ceramic substrate; a plastic substrate; or the like can be used. An element such as a transistor for forming a pixel and the like of a liquid crystal display device may be provided over the substrate.

The first sealant 102 can be formed using a thermosetting resin. The thermosetting resin is a resin cured by heat treatment. For the thermosetting resin, an epoxy-based resin, an acrylate-based (urethane acrylate) resin, or the like can be used. A filler may be mixed into the first sealant 102. In addition, spacers may be dispersed before formation of the first sealant 102.

Moreover, the first sealant 102 may be formed so as to form a frame (closed-loop shape). Here, a case where the first sealant 102 is formed so as to form a frame with a rectangular shape is described. Note that the frame shape of the first sealant 102 is not limited to the rectangular shape, and the first sealant 102 may be formed so as to form a frame with a circular shape, an elliptical shape, a polygonal shape other than a rectangular shape, or the like.

Furthermore, after the first sealant 102 is formed over the first substrate 100, the first sealant 102 may be pre-cured through heat treatment. By pre-curing the first sealant 102, mixture of an impurity into a liquid crystal from the first sealant 102 can be suppressed when the liquid crystal is in contact with the first sealant 102 later.

Figure 1D:
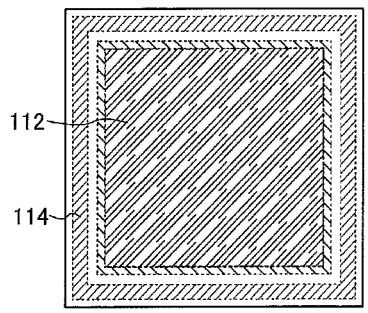
Figure 1B:
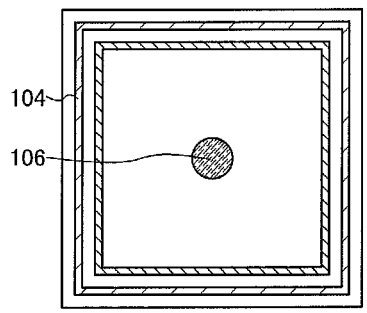

Next, a second sealant 104 is formed on an outer side than the first sealant 102 over the first substrate 100, and a liquid crystal material 106 is dropped on an inner side than the first sealant 102 (on an inner side than the frame of the first sealant 102) (see FIG. 1B). The second sealant 104 may be formed apart from the first sealant 102.

The second sealant 104 can be formed using a photocurable and thermosetting resin. The photocurable and thermosetting resin is pre-cured by light irradiation and then post-cured by heat treatment. As the photocurable and thermosetting resin, a resin in which an acrylic-based resin and an epoxy-based resin are mixed can be used. Further, a UV initiator, a thermosetting agent, a coupling agent, or the like may be mixed into the resin. Furthermore, a filler may be mixed into the second sealant 104.

The second sealant 104 serves for improvement of adhesion between substrates at the time of attachment of the substrates, which is performed later. Therefore, the viscosity of a resin used for the second sealant 104 is made higher than that of the resin used for the first sealant 102. As the second sealant 104, a resin with a viscosity of greater than or equal to 200 Pa·sec (25° C.) and less than or equal to 450 Pa·sec (25° C.) is preferably used and a resin with a viscosity of greater than or equal to 250 Pa·sec (25° C.) and less than or equal to 400 Pa·sec (25° C.) is more preferably used. Here, the term "viscosity" means a viscosity before another substrate is attached to the first substrate 100. In addition, the viscosity of the sealant can be measured with any one of a rotational viscometer, a falling sphere viscometer, and a capillary viscometer.

The second sealant 104 can surround the first sealant 102 and form a frame. The second sealant 104 is formed so as to surround the first sealant 102, whereby adhesion between substrates can be improved effectively. Here, a case where the second sealant 104 is formed so as to form a frame with a rectangular shape as in the first sealant 102 is described; however, the frame shape of the second sealant 104 is not limited to the rectangular shape, and the second sealant 104 may be formed so as to form a frame with a circular shape, an elliptical shape, a polygonal shape other than a rectangular shape, or the like.

As the liquid crystal material 106, a liquid crystal material which exhibits a blue phase can be used. The liquid crystal material which exhibits a blue phase includes a liquid crystal, a chiral agent, a photocurable resin, and a photopolymerization initiator. The chiral agent is used to align the liquid crystal in a helical structure and to make the liquid crystal exhibit a blue phase. As an example, a liquid crystal material into which a chiral agent is mixed at 5 wt % or more can be used. As the liquid crystal, a thermotropic liquid crystal, a low-molecular liquid crystal, a high-molecular liquid crystal, a ferroelectric liquid crystal, an anti-ferroelectric liquid crystal, or the like can be used. Note that the liquid crystal material which exhibits a blue phase does not need to exhibit a blue phase at the time when the liquid crystal material is dropped over the first substrate 100, and any liquid crystal material can be used as the liquid crystal material which exhibits a blue phase as long as it exhibits a blue phase at a given temperature by control of the temperature.

Note that FIG. 1B illustrates a case where one droplet of the liquid crystal material 106 is dropped on an inner side than the first sealant 102 (an ODF method). Note that the method is not limited to such a method, and a plurality of droplets of the liquid crystal material 106 may be dropped at appropriate places on an inner side than the first sealant 102, and an appropriate amount of the liquid crystal material may be dropped.

In FIG. 1B, the order of steps of forming the second sealant 104 and dropping the liquid crystal material 106 is not limited; however, it is preferable that the second sealant 104 be formed and then the liquid crystal material 106 be dropped.

Figure 1E:
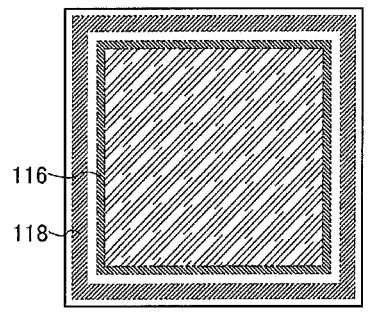
Figure 1C:
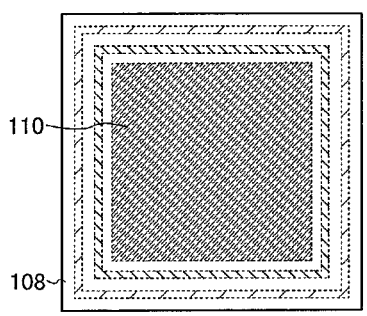

Next, the first substrate 100 and a second substrate 108 are attached to each other (see FIG. 1C). The first substrate 100 can be attached to the second substrate 108 with the use of the first sealant 102 and the second sealant 104.

When the first substrate 100 and the second substrate 108 are attached to each other, the dropped liquid crystal material 106 spreads over the substrate surface; thus, a liquid crystal layer 110 is formed. The viscosity of the liquid crystal material 106 is high because the liquid crystal material 106 includes a chiral agent. Accordingly, the liquid crystal layer 110 does not necessarily spread over the entire surface on an inner side than the first sealant 102 (the liquid crystal layer 110 is not necessarily in contact with the first sealant 102) at the stage of FIG. 1C.

As the second substrate 108, as in the first substrate 100, glass substrates used for electronics industry such as an aluminosilicate glass substrate, an aluminoborosilicate glass substrate, or a barium borosilicate glass substrate; a quartz substrate; a ceramic substrate; a plastic substrate; or the like can be used.

In addition, the first substrate 100 and the second substrate 108 are preferably attached to each other in a reduced-pressure atmosphere. This is because when the substrates are attached to each other in a reduced-pressure atmosphere, even if the substrates are exposed to the atmosphere after attachment, a vacuum state can be kept on an inner side than the sealant and the liquid crystal can finally spread to end portions of the sealant (the liquid crystal can be formed in contact with the sealant).

Next, polymer stabilization treatment is performed on the liquid crystal layer 110 to form a liquid crystal layer 112 (see FIG. 1D).

The polymer stabilization treatment can be performed in such a manner that a liquid crystal material including a liquid crystal, a chiral agent, a photocurable resin, and a photopolymerization initiator is irradiated with light having a wavelength with which the photocurable resin and the photopolymerization initiator are reacted. In this embodiment, the polymer stabilization treatment is performed in such a manner that the temperature of the liquid crystal layer 110 is controlled and the liquid crystal layer 110 in a state of exhibiting a blue phase is irradiated with light.

However, the polymer stabilization treatment is not limited to this manner and may be performed in such a manner that the liquid crystal layer 110 in a state of exhibiting an isotropic phase at a temperature within +10° C., preferably +5° C. of the phase transition temperature between the blue phase and the isotropic phase is irradiated with light. The phase transition temperature between a blue phase and an isotropic phase refers to a temperature at which the phase transfers from a blue phase to an isotropic phase when the temperature is raised or a temperature at which the phase transfers from an isotropic phase to a blue phase when the temperature is decreased.

As an example of the polymer stabilization treatment, after the liquid crystal layer 110 is heated to exhibit an isotropic phase, the temperature of the liquid crystal layer 110 can be gradually decreased so that the phase transfers to a blue phase, and then, light irradiation can be performed while the temperature at which the blue phase is exhibited is kept. Alternatively, after the phase transfers to an isotropic phase by gradually heating the liquid crystal layer 110, the liquid crystal layer 110 at a temperature within +10° C., preferably +5° C. of the phase transition temperature between a blue phase and an isotropic phase (in a state of exhibiting an isotropic phase) can be irradiated with light. In the case of using an ultraviolet curable resin (a UV curable resin) as the photocurable resin included in the liquid crystal material, the liquid crystal layer 110 may be irradiated with ultraviolet rays.

Further, the polymer stabilization treatment can be performed in the air atmosphere. In this case, the first substrate 100 and the second substrate 108 are attached to each other in a reduced-pressure atmosphere and then the reduced pressure state is changed to be an air atmosphere state (the substrates are exposed to the atmosphere). After that, the polymer stabilization treatment may be performed. In the liquid crystal display device including a blue phase liquid crystal layer, the thickness of the liquid crystal layer (cell thickness) is large in many cases. Thus, when the first substrate 100 and the second substrate 108 are attached to each other with the use of the photocurable and thermosetting second sealant 104 with a high viscosity, even if the substrates are exposed to the atmosphere from the reduced-pressure atmosphere, adhesion between the substrates can be kept and a vacuum state can be kept on an inner side than the sealant.

Furthermore, when the second sealant 104 is formed so as to form a frame, a region between the first sealant 102 and the second sealant 104 can be in a vacuum state as well even if the substrates are exposed to the atmosphere. In this case, even if the viscosity of the first sealant 102 is low and adhesion is not sufficient when the substrates are exposed to the atmosphere after being attached to each other, a vacuum state can be kept on an inner side than the first sealant 102 and the liquid crystal can spread to the region which is in contact with the first sealant 102 finally.

In addition, when heat treatment is performed in polymer stabilization treatment, the viscosity of the liquid crystal layer 110 is reduced. Accordingly, even when the liquid crystal layer 110 does not spread over the entire surface on an inner side than the first sealant 102 at the stage of FIG. 1C, the liquid crystal layer 110 can spread to the region which is in contact with the first sealant 102 in the heat treatment in the polymer stabilization treatment. Note that the viscosity of the second sealant 104 (a second sealant 114 in FIG. 1D) is reduced and the width of the second sealant 104 is increased in the heat treatment in the polymer stabilization treatment in some cases.

When the polymer stabilization treatment is performed, the temperature range where the liquid crystal layer 112 exhibits a blue phase can be widened.

Note that the second sealant 114 may be cured at the same time as a step of light irradiation in the polymer stabilization treatment.

Next, heat treatment is performed to post-cure the first sealant 102 (see FIG. 1E). In the case where the second sealant 114 is irradiated with light to be pre-cured in FIG. 1D, the second sealant 114 can also be post-cured at the same time through this heat treatment. As a result, a post-cured first sealant 116 and a post-cured second sealant 118 can be obtained.

Note that the first sealant 102 may be post-cured in the heat treatment in the polymer stabilization treatment. In this case, the heat treatment step (the step of FIG. 1E) can be omitted; thus, the manufacturing process can be simplified.

Figure 1F:
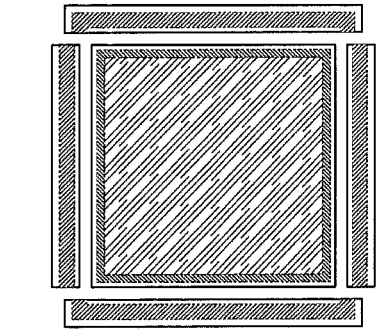

Next, the first substrate 100 and the second substrate 108 which are attached to each other are cut (see FIG. 1F). Here, the first substrate 100 and the second substrate 108 can be cut between the post-cured first sealant 116 and the post-cured second sealant 118. That is, in this embodiment, even when the width of the second sealant 104 is increased due to the polymer stabilization treatment which is performed before the photocurable and thermosetting second sealant 104 is irradiated with ultraviolet rays, the second sealant 104 can be removed. This is because the second sealant 104 does not seal in the liquid crystal layer 112 directly.

Note that in the step of cutting the substrates, which is illustrated in FIG. 1F, the substrates may be partly cut in consideration of attachment of an FPC and the like. In this case, a liquid crystal display device in which the second sealant 118 is partly formed is manufactured in some cases.

As illustrated in FIGS. 1A to 1F, the photocurable and thermosetting second sealant is formed on an outer side than the thermosetting first sealant and made to serve for improvement of adhesion between the substrates, whereby irradiation with ultraviolet rays for pre-curing the second sealant is not needed. Accordingly, irradiation with ultraviolet rays for pre-curing the second sealant is not performed on the liquid crystal material before the liquid crystal material is subjected to polymer stabilization treatment; thus, a liquid crystal display device including a liquid crystal layer which exhibits a stable blue phase can be manufactured. In addition, even in the case where polymer stabilization treatment is performed before the photocurable and thermosetting second sealant is irradiated with ultraviolet rays, when a thermosetting sealant is used as the first sealant which is in contact with the liquid crystal layer and the photocurable and thermosetting second sealant is formed on an outer side than the first sealant, adhesion between the substrates can be kept (a vacuum state can be kept on an inner side than the sealant) even when the substrates are exposed to the atmosphere from a reduced-pressure atmosphere, and increase in the width of the first sealant which is in contact with the liquid crystal layer can be suppressed.

Modified Example

FIGS. 1A to 1F illustrate a case where the first sealant 102 is post-cured after polymer stabilization treatment; however, this embodiment is not limited to such a manner. For example, as illustrated in FIGS. 2A to 2F, the second substrate 108 and the first substrate 100 provided with the first sealant 102 may be attached to each other, the second sealant 104, and the liquid crystal material 106 (see FIGS. 2A to 2C), and then heat treatment may be performed to post-cure the first sealant 102 (see FIG. 2D). After that, polymer stabilization treatment may be performed (see FIG. 2E). That is, FIGS. 2A to 2F illustrate a case where the order of the step in FIG. 1D is replaced with the order of the step in FIG. 1E in the steps illustrated in FIGS. 1A to 1F.

Figure 2A:
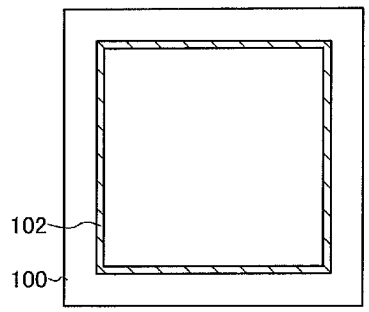
FIGS. 2A to 2F are views illustrating an example of a method for manufacturing a liquid crystal display device.
Figure 2D:
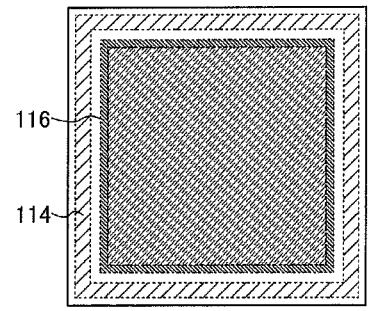
Figure 2B:
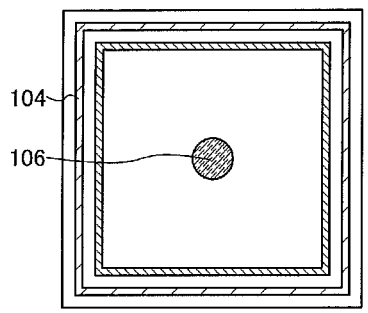
Figure 2E:
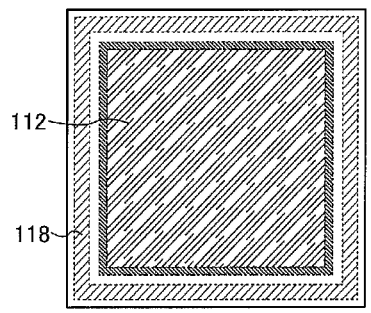
Figure 2C:
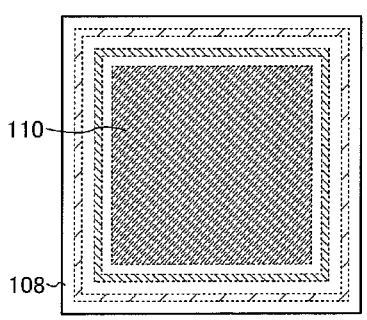
Figure 2F:
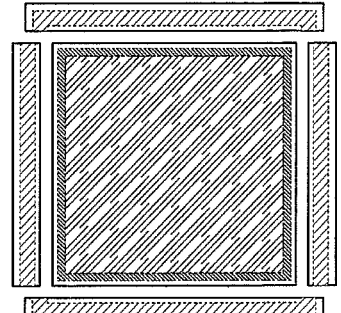

Note that FIGS. 2A to 2F illustrate a case where the substrates are cut after polymer stabilization treatment (see FIG. 2F); however, the substrates may be cut in a period after the first sealant 102 is post-cured and before the polymer stabilization treatment is performed (in a period between FIGS. 2D and 2E).

In addition, in this embodiment, a case where the first sealant 102, the second sealant 104, and the liquid crystal material 106 are formed over the first substrate 100 is described; however, this embodiment is not limited to such a manner. For example, the first sealant 102 and the second sealant 104 may be formed over the first substrate 100, and the liquid crystal material 106 may be formed over the second substrate 108. Then, the substrates may be attached to each other. Alternatively, the first sealant 102 and the liquid crystal material 106 may be formed over the first substrate 100, and the second sealant 104 may be formed over the second substrate 108. Then, the substrates may be attached to each other. Further alternatively, the first sealant 102 may be formed over the first substrate 100, and the second sealant 104 and the liquid crystal material 106 may be formed over the second substrate 108. Then, the substrates may be attached to each other.

In addition, an element such as a transistor included in a liquid crystal display device may be formed in advance over the first substrate 100 or the second substrate 108.

Moreover, in this embodiment, a case where the second sealant 104 is formed on an outer side than the first sealant 102 so that the sealants are formed so as to form a double frame is described; however, this embodiment is not limited to such a manner. Either or both of a thermosetting sealant and, a photocurable and thermosetting sealant may be formed between the first sealant 102 and the second sealant 104 so that the sealants are formed so as to form a triple or more frame.

This embodiment can be implemented in combination with any of the structures described in the other embodiments as appropriate.

Embodiment 2

In this embodiment, a method for manufacturing liquid crystal display devices, which is different from the method in Embodiment 1, is described with reference to drawings. Specifically, a step of taking out a plurality of panels (obtaining a plurality of panels) from one panel is described. Note that the manufacturing method described in this embodiment has a lot in common with those in FIGS. 1A to 1F and FIGS. 2A to 2F. Therefore, description of common portions is omitted and different portions are described below.

Figure 3A:
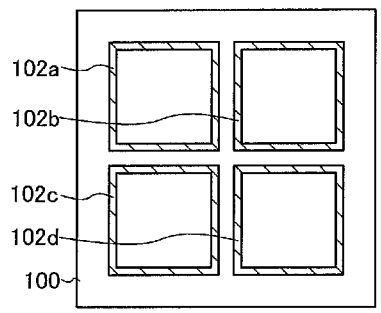
FIGS. 3A to 3F are views illustrating an example of a method for manufacturing liquid crystal display devices.

First, the first substrate 100 is prepared and a plurality of first sealants 102a, 102b, 102c, and 102d is formed over the first substrate 100 (see FIG. 3A).

The first sealants 102a to 102d can be formed using a thermosetting sealant. The description of the first sealant 102 in Embodiment 1 can be referred to for details of materials used for the first sealants 102a to 102d and the like; therefore, the description thereof is omitted here.

Further, after the first sealants 102a to 102d are formed over the first substrate 100, the first sealants 102a to 102d may be pre-cured through heat treatment. By pre-curing the first sealants 102a to 102d, mixture of an impurity into a liquid crystal can be suppressed when the liquid crystal is in contact with the first sealants 102a to 102d later.

Figure 3D:
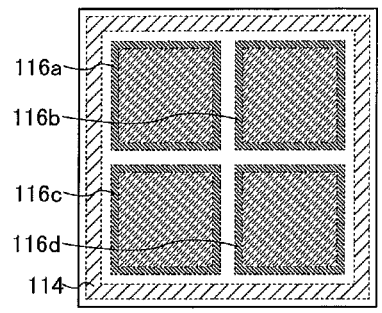
Figure 3B:
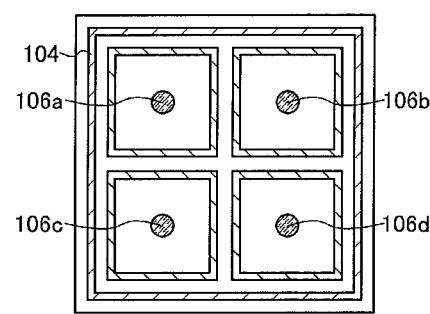

Next, the photocurable and thermosetting second sealant 104 is formed over the first substrate 100 and on an outer side than the first sealant 102, and liquid crystal materials 106a to 106d are dropped on the inner side than the first sealants 102a to 102d (on the inner side than the frames) (see FIG. 3B).

The second sealant 104 can be formed so as to surround the first sealants 102a to 102d. The second sealant 104 is formed so as to surround the first sealants 102a to 102d, whereby adhesion between the substrates can be improved.

The second sealant 104 serves for improvement of adhesion between substrates at the time of attachment of the substrates. Therefore, the viscosity of a resin used for the second sealant 104 is made higher than those of resins used for the first sealants 102a to 102d.

A liquid crystal material which exhibits a blue phase can be used for the liquid crystal materials 106a to 106d. The description of the liquid crystal material 106 in Embodiment 1 can be referred to for details of materials used for the liquid crystal materials 106a to 106d and the like; therefore, the description thereof is omitted here.

Moreover, FIG. 3B illustrates a case where one droplet of the liquid crystal materials 106a to 106d is dropped on the inner side than the first sealants 102a to 102d. Note that this embodiment is not limited to such a manner, and appropriate amounts of the liquid crystal materials may be dropped at appropriate places on the inner side than the first sealants 102a to 102d.

In FIG. 3B, the order of steps of forming the second sealant 104 and dropping the liquid crystal materials 106a to 106d is not limited; however, it is preferable that the second sealant 104 be formed and then the liquid crystal materials 106a to 106d be dropped.

Figure 3E:
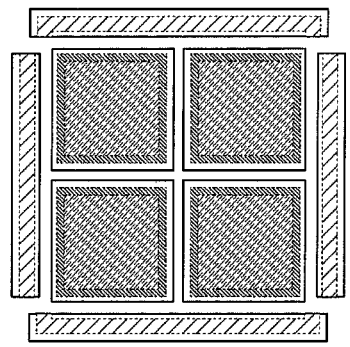
Figure 3C:
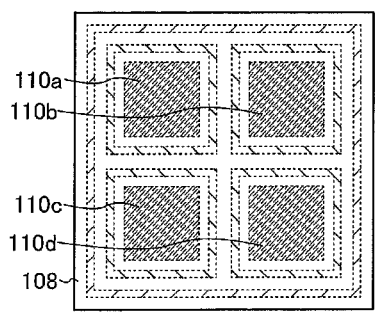

Next, the first substrate 100 and the second substrate 108 are attached to each other (see FIG. 3C). The first substrate 100 and the second substrate 108 can be attached to each other with the use of the first sealants 102a to 102d and the second sealant 104.

When the first substrate 100 and the second substrate 108 are attached to each other, the dropped liquid crystal materials 106a to 106d spread over the substrate surface; thus, liquid crystal layers 110a to 110d are formed. The viscosity of the liquid crystal materials 106a to 106d is high because the liquid crystal materials 106a to 106d each include a chiral agent. Accordingly, the liquid crystal layers 110a to 110d do not necessarily spread over the entire surfaces on the inner side than the first sealants 102a to 102d (the liquid crystal layers 110a to 110d are not necessarily in contact with the first sealants 102a to 102d).

In addition, the first substrate 100 and the second substrate 108 are preferably attached to each other in a reduced-pressure atmosphere. When the substrates are attached to each other in a reduced-pressure atmosphere, even if the substrates are exposed to the atmosphere after attachment, a vacuum state can be kept on the inner side than the sealants and the liquid crystal can finally spread to be in contact with the sealant.

Next, heat treatment is performed to post-cure the first sealants 102a to 102d (see FIG. 3D). As a result, post-cured first sealants 116a to 116d can be obtained. The heat treatment can be performed in a reduced-pressure atmosphere or in the normal air atmosphere.

Moreover, the viscosity of the liquid crystal layers 110a to 110d is reduced through this heat treatment, and the liquid crystal layers 110a to 110d can spread to the regions which are in contact with the first sealants 116a to 116d. Note that the viscosity of the second sealant 104 (the second sealant 114 in FIG. 3D) is reduced and the width of the second sealant 104 is increased in the heat treatment in some cases.

Next, the first substrate 100 and the second substrate 108 which are attached to each other are cut (see FIG. 3E). Here, the first substrate 100 and the second substrate 108 can be cut between the post-cured first sealant 116 and the second sealant 114.

Figure 3F:
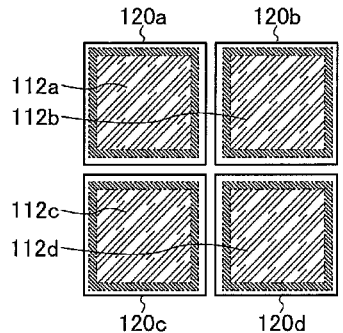

Next, the liquid crystal layers 110a to 110d which are provided for liquid crystal display panels 120a to 120d, which are separated from each other, are subjected to polymer stabilization treatment to form liquid crystal layers 112a to 112d (see FIG. 3F).

As illustrated in FIGS. 3A to 3F, in the case of obtaining a plurality of panels from one panel, the substrates are cut and then the cut substrates can be separately subjected to polymer stabilization treatment. Accordingly, reduction in the size of an apparatus used for light irradiation in the polymer stabilization treatment can be achieved, and the liquid crystal layer can be uniformly irradiated with light. As a result, a liquid crystal display device including a liquid crystal layer which exhibits a stable blue phase can be manufactured. In particular, in the case of obtaining a plurality of panels from one panel, large-sized substrates are used as the first substrate 100 and the second substrate 108; thus, polymer stabilization treatment is preferably performed after division.

This embodiment can be implemented in combination with any of the structures described in the other embodiments as appropriate.

Embodiment 3

In this embodiment, a method for manufacturing a liquid crystal display device, which is different from the methods in Embodiments 1 and 2, is described with reference to drawings.

Figure 4A:
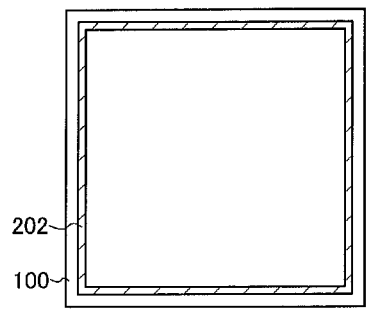
FIGS. 4A to 4F are views illustrating an example of a method for manufacturing a liquid crystal display device.

First, the first substrate 100 is prepared and a sealant 202 is formed over the first substrate 100 (see FIG. 4A).

The sealant 202 can be formed using a photocurable and thermosetting resin. As the photocurable and thermosetting resin, a resin in which an acrylic-based resin and an epoxy-based resin are mixed can be used. Further, a UV initiator, a thermosetting agent, a coupling agent, or the like is preferably mixed into the resin. Furthermore, a filler may be mixed into the sealant 202.

Moreover, the sealant 202 may be formed so as to form a frame (closed-loop shape). Here, a case where the sealant 202 is formed so as to form a frame with a rectangular shape is described. Note that the frame shape of the sealant 202 is not limited to the rectangular shape, and the sealant 202 may be formed so as to form a frame with a circular shape, an elliptical shape, a polygonal shape other than a rectangular shape, or the like.

Figure 4D:
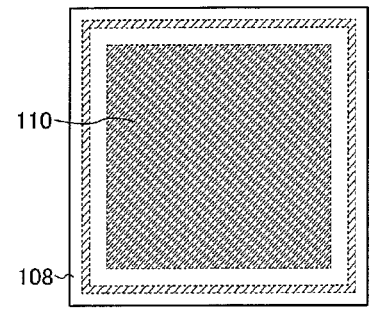
Figure 4B:
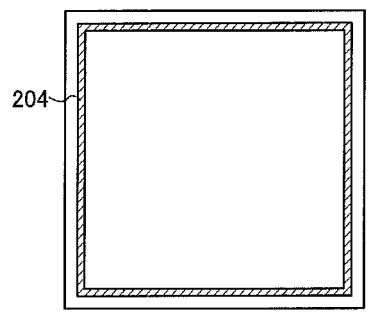

Next, the sealant 202 is irradiated with ultraviolet rays to be pre-cured (see FIG. 4B). As a result, a pre-cured sealant 204 is obtained. By pre-curing the sealant 202, mixture of an impurity into a liquid crystal can be suppressed when the liquid crystal is in contact with the sealant 204 later.

Figure 4E:
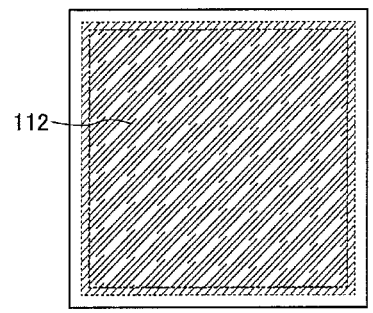
Figure 4C:
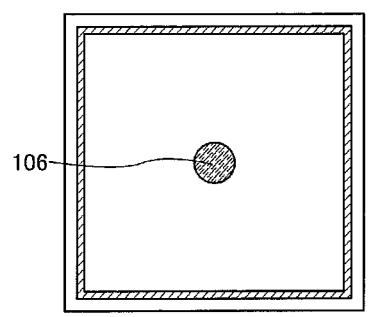

Then, the liquid crystal material 106 is dropped on an inner side than the pre-cured sealant 204 (on an inner side than the frame of the first sealant 204) (see FIG. 4C). By irradiating the sealant 202 with ultraviolet rays to be pre-cured before formation of the liquid crystal material 106, the liquid crystal material 106 can be prevented from being irradiated with unintended light.

Next, the first substrate 100 and the second substrate 108 are attached to each other (see FIG. 4D). The first substrate 100 can be attached to the second substrate 108 with the use of the sealant 202.

When the first substrate 100 and the second substrate 108 are attached to each other, the dropped liquid crystal material 106 spreads over the substrate surface; thus, the liquid crystal layer 110 is formed. The viscosity of the liquid crystal material 106 is high because the liquid crystal material 106 includes a chiral agent. Accordingly, the liquid crystal layer 110 does not necessarily spread over the entire surface on an inner side than the pre-cured sealant 204 (the liquid crystal layer 110 is not necessarily in contact with the pre-cured sealant 204).

In addition, the first substrate 100 and the second substrate 108 are preferably attached to each other in a reduced-pressure atmosphere. This is because when the substrates are attached to each other in a reduced-pressure atmosphere, even if the substrates are exposed to the atmosphere after attachment, a vacuum state can be kept on an inner side than the sealant and the liquid crystal can finally spread to end portions of the sealant (the liquid crystal can be formed in contact with the sealant).

Next, polymer stabilization treatment is performed on the liquid crystal layer 110 to form the liquid crystal layer 112 (see FIG. 4E).

When heat treatment is performed in the polymer stabilization treatment, the viscosity of the liquid crystal layer 110 is reduced. Accordingly, in FIG. 4D, even when the liquid crystal layer 110 does not spread over the entire surface on an inner side than the pre-cured sealant 204, the liquid crystal layer 110 can spread to the region which is in contact with the pre-cured sealant 204 in the heat treatment in the polymer stabilization treatment.

When the polymer stabilization treatment is performed, the temperature range where the liquid crystal layer 112 exhibits a blue phase can be widened.

Figure 4F:
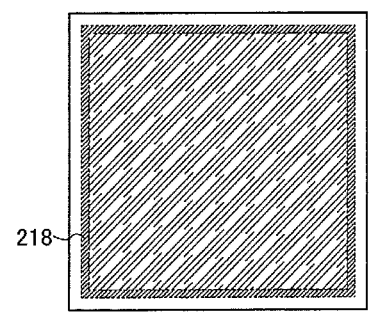

Next, heat treatment is performed to post-cure the sealant 202 (see FIG. 4F). As a result, a post-cured sealant 218 can be obtained.

Note that the pre-cured sealant 204 may be post-cured in the heat treatment in the polymer stabilization treatment. In this case, the heat treatment step (the step of FIG. 4F) can be omitted; thus, a manufacturing process can be simplified.

Through the above steps, a liquid crystal display device including a blue phase liquid crystal layer can be manufactured.

Note that in the steps in FIGS. 4A to 4F, the pre-cured sealant 204 may be subjected to heat treatment to be post-cured before the polymer stabilization treatment. In this case, a structure where the order of the step in FIG. 4E is replaced with the order of the step in FIG. 4F can be obtained.

Further, heat treatment in the polymer stabilization treatment and heat treatment for post-curing the pre-cured sealant 204 may be performed at the same time. In this case, the number of heat treatment steps can be reduced.

Furthermore, FIGS. 4A to 4F illustrate a case where the sealant 202 and the liquid crystal material 106 are formed over the first substrate 100; however, this embodiment is not limited to such a manner. For example, the sealant 202 may be formed over the first substrate 100, the liquid crystal material 106 may be formed over the second substrate 108, and then the first substrate 100 and the second substrate 108 may be attached to each other.

As illustrated in FIGS. 4A to 4F, even when a liquid crystal dropping method is performed using a photocurable and thermosetting sealant, the sealant 202 is irradiated with ultraviolet rays to be pre-cured before formation of the liquid crystal material 106, whereby the liquid crystal material 106 can be prevented from being irradiated with unintended light. As a result, a liquid crystal display device including a liquid crystal layer which exhibits a stable blue phase can be manufactured. In addition, the sealant is irradiated with ultraviolet rays to be pre-cured before heat is applied to the sealant, whereby it is possible to suppress the increase in the width of the photocurable and thermosetting sealant.

<Step of Obtaining a Plurality of Panels from One Panel>

Next, a case where the method illustrated in FIGS. 4A to 4F is used in a step of taking out a plurality of panels (obtaining a plurality of panels) from one panel is described with reference to FIGS. 5A to 5F. Note that the manufacturing method illustrated in FIGS. 5A to 5F has a lot in common with that in FIGS. 4A to 4F. Therefore, description of common portions is omitted and different portions are described below.

Figure 5A:
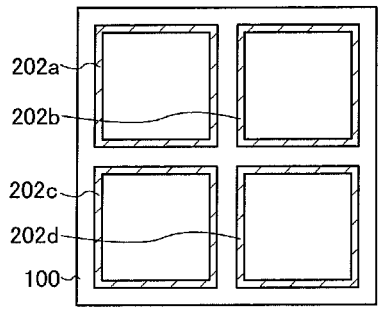
FIGS. 5A to 5F are views illustrating an example of a method for manufacturing liquid crystal display devices.

First, the first substrate 100 is prepared, and a plurality of sealants 202a to 202d is formed over the first substrate 100 (see FIG. 5A).

The sealants 202a to 202d can be each formed using a photocurable and thermosetting resin. The description of the sealant 202 illustrated in FIGS. 4A to 4F can be referred to for details such as materials used for the sealants 202a to 202d; therefore, the description thereof is omitted here.

Figure 5D:
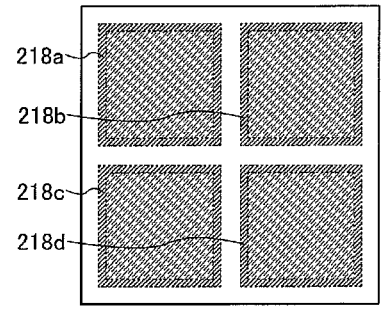
Figure 5B:
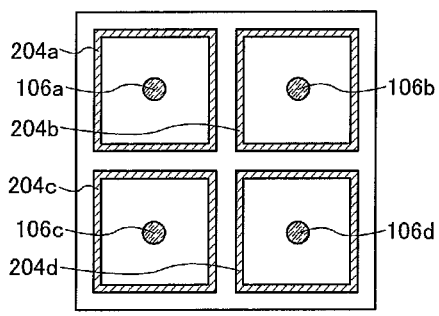

Next, the sealants 202a to 202d are irradiated with ultraviolet rays to be pre-cured, and then the liquid crystal materials 106a to 106d are dropped on the inner side than pre-cured sealants 204a to 204d (on the inner side than the frames) (see FIG. 5B).

Figure 5E:
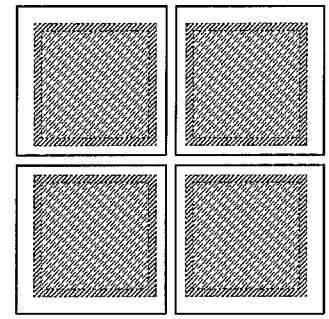
Figure 5C:
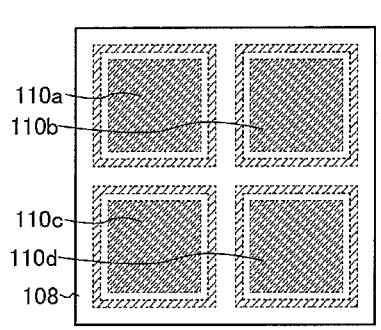

Then, the first substrate 100 and the second substrate 108 are attached to each other (see FIG. 5C). The first substrate 100 and the second substrate 108 can be attached to each other with the use of the sealants 202a to 202d.

When the first substrate 100 and the second substrate 108 are attached to each other, the dropped liquid crystal materials 106a to 106d spread over the substrate surface; thus, the liquid crystal layers 110a to 110d are formed. The viscosity of the liquid crystal materials 106a to 106d is high because the liquid crystal materials 106a to 106d each include a chiral agent. Accordingly, the liquid crystal layers 110a to 110d do not necessarily spread over the entire surfaces on the inner side than the sealants 202a to 202d.

In addition, the first substrate 100 and the second substrate 108 are preferably attached to each other in a reduced-pressure atmosphere.

Next, heat treatment is performed to post-cure the sealants 204a to 204d (see FIG. 5D). As a result, post-cured sealants 218a to 218d can be obtained. The heat treatment can be performed in a reduced-pressure atmosphere or in the normal air atmosphere.

Moreover, the viscosity of the liquid crystal layers 110a to 110d is reduced through this heat treatment, and the liquid crystal layers 110a to 110d can spread to regions which are in contact with the sealants 218a to 218d.

Next, the first substrate 100 and the second substrate 108 which are attached to each other are cut (see FIG. 5E). Here, the first substrate 100 and the second substrate 108 can be cut between the post-cured sealants 218a and 218b, sealants 218b and 218c, sealants 218c and 218d, and sealants 218a and 218d.

Figure 5F:
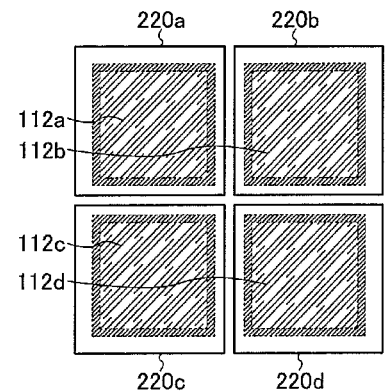

Next, the liquid crystal layers 110a to 110d which are provided for liquid crystal display panels 220a to 220d which are separated from each other are subjected to polymer stabilization treatment to form liquid crystal layers 112a to 112d (see FIG. 5F).

As illustrated in FIGS. 5A to 5F, in the case of obtaining a plurality of panels from one panel, the substrates are cut and then the cut substrates are separately subjected to polymer stabilization treatment. Accordingly, reduction in the size of an apparatus used for light irradiation in the polymer stabilization treatment can be achieved, and the liquid crystal layer can be uniformly irradiated with light. As a result, a liquid crystal display device including a liquid crystal layer which exhibits a stable blue phase can be manufactured. In particular, in the case of obtaining a plurality of panels from one panel, large-sized substrates are used as the first substrate 100 and the second substrate 108; thus, polymer stabilization treatment is preferably performed after division.

This embodiment can be implemented in combination with any of the structures described in the other embodiments as appropriate.

Embodiment 4

In this embodiment, an example of the liquid crystal display device which is manufactured in Embodiment 1, 2, or 3 is described with reference to drawings.

Figure 6B:
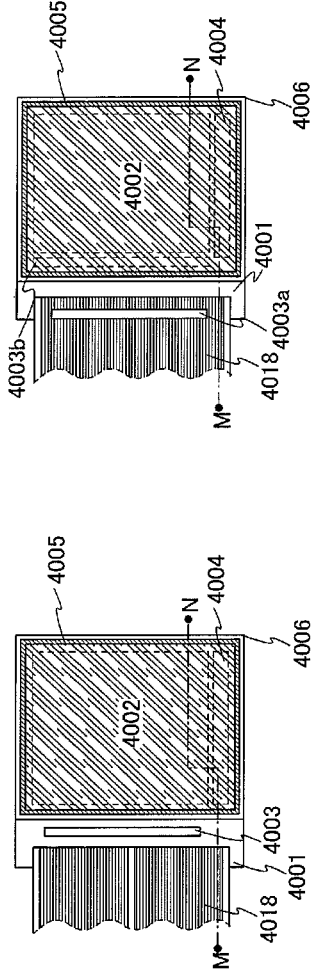
Figure 6B:
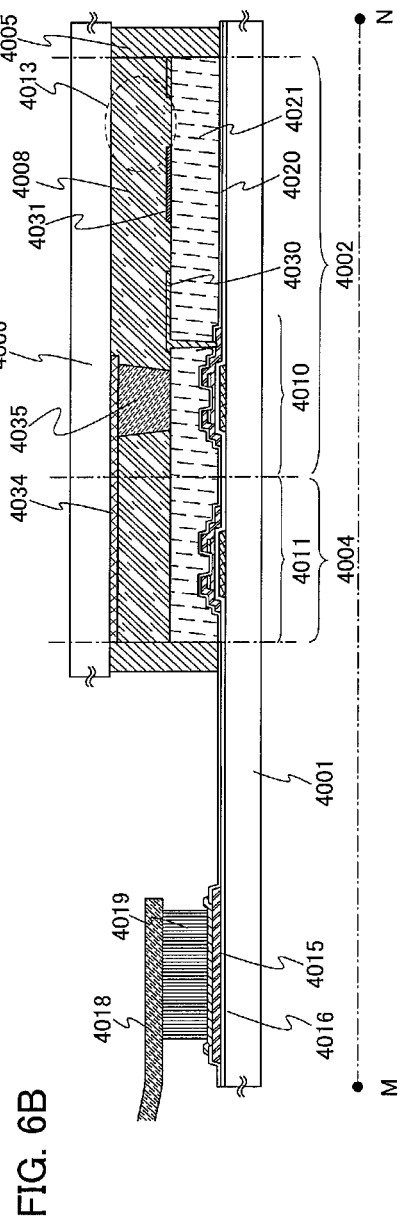

FIGS. 6A1 and 6A2 are top views of panels in which transistors 4010 and 4011 and a liquid crystal element 4013 which are formed over a first substrate 4001 are sealed between the first substrate 4001 and a second substrate 4006 with a sealant 4005. FIG. 6B is a cross-sectional view taken along line M-N of FIGS. 6A1 and 6A2.

The sealant 4005 is provided so as to surround a pixel portion 4002 and a scan line driver circuit 4004 which are provided over the first substrate 4001. In addition, the second substrate 4006 is provided over the pixel portion 4002 and the scan line driver circuit 4004. The pixel portion 4002 and the scan line driver circuit 4004 are sealed between the first substrate 4001 and the second substrate 4006 with the sealant 4005 together with a liquid crystal layer 4008 which exhibits a blue phase. In the case where Embodiment 1 or 2 is applied, the sealant 4005 is formed using a thermosetting resin. In the case where Embodiment 3 is applied, the sealant 4005 is formed using a photocurable and thermosetting resin.

In FIG. 6A1, a signal line driver circuit 4003 which is formed over a substrate separately prepared using a single crystal semiconductor film or a polycrystalline semiconductor film is mounted in a region which is different from the region surrounded by the sealant 4005 formed over the first substrate 4001. In contrast, FIG. 6A2 illustrates an example in which part of a signal line driver circuit is formed over the first substrate 4001 with the use of a thin film transistor which includes an oxide semiconductor. A signal line driver circuit 4003b is formed over the first substrate 4001 and a signal line driver circuit 4003a which is formed using a single crystal semiconductor film or a polycrystalline semiconductor film is mounted on the substrate separately prepared.

Note that there is no particular limitation on the connection method of a driver circuit which is separately formed, and a COG method, a wire bonding method, a TAB method, or the like can be used. FIG. 6A illustrates an example of mounting the signal line driver circuit 4003 by a COG method, and FIG. 6A2 illustrates an example of mounting the signal line driver circuit 4003 by a TAB method.

Further, the pixel portion 4002 and the scan line driver circuit 4004 provided over the first substrate 4001 each include a plurality of transistors. FIG. 6B illustrates the transistor 4010 included in the pixel portion 4002 and the transistor 4011 included in the scan line driver circuit 4004. Insulating layers 4020 and 4021 are provided over the transistors 4010 and 4011.

Various kinds of transistors can be applied to the transistors 4010 and 4011 without particular limitation. A semiconductor formed using silicon (for example, amorphous silicon, microcrystalline silicon, or polysilicon) or an oxide semiconductor or the like can be used for a channel layer of each of the transistors 4010 and 4011.

In addition, a pixel electrode layer 4030 and a common electrode layer 4031 are provided over the first substrate 4001, and the pixel electrode layer 4030 is electrically connected to the transistor 4010. The liquid crystal element 4013 includes the pixel electrode layer 4030, the common electrode layer 4031, and the liquid crystal layer 4008.

In a liquid crystal display device including the liquid crystal layer 4008 which exhibits a blue phase, a method in which the gray scale is controlled by generating an electric field generally parallel (i.e., in a lateral direction) to a substrate to move liquid crystal molecules in a plane parallel to the substrate can be used. For such a method, an electrode structure used in a plane switching (IPS) mode illustrated in FIGS. 6A1 and 6A2 and FIG. 6B is employed in this embodiment. Note that without limitation to an IPS mode, an electrode structure used in a fringe field switching (FFS) mode can also be employed.

As the first substrate 4001 and the second substrate 4006, glass, plastic, or the like having a light-transmitting property can be used. As plastic, polyether sulfone (PES), polyimide, a fiberglass-reinforced plastic (FRP) plate, a polyvinyl fluoride (PVF) film, a polyester film, or an acrylic resin film can be used. Further, a sheet in which aluminum foil is sandwiched between PVF films or polyester films can also be used.

Furthermore, a columnar spacer 4035 which is provided in order to control the thickness (a cell gap) of the liquid crystal layer 4008 can be obtained by selective etching of an insulating film. Note that a spherical spacer may be used instead of the columnar spacer 4035.

In FIGS. 6A1 and 6A2 and FIG. 6B, a light-blocking layer 4034 is provided on the second substrate 4006 side so as to cover the transistors 4010 and 4011. With provision of the light-blocking layer 4034, the advantageous effect of stabilizing the thin film transistors can be increased. The light-blocking layer 4034 may be provided over the first substrate 4001. In this case, when polymer stabilization is performed by irradiation with ultraviolet rays from the second substrate 4006 side, a liquid crystal over the light-blocking layer 4034 can also be polymer-stabilized when it exhibits a blue phase.

The light-blocking layer 4034 may be covered with the insulating layer 4020 which functions as a protective film of the transistors; however, there is no particular limitation.

Note that the protective film is provided to prevent entry of contaminant impurities floating in the air, such as an organic substance, a metal substance, or moisture, and is preferably a dense film. The protective film may be formed by a sputtering method to have a single-layer structure or a stacked-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

After the protective film is formed, the semiconductor layer may be subjected to annealing (300° C. to 400° C.).

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

A conductive composition containing a conductive high-molecular compound (also referred to as a conductive polymer) can also be used for each of the pixel electrode layer 4030 and the common electrode layer 4031.

Further, a variety of signals and potentials are supplied, from an FPC 4018, to the signal line driver circuit 4003 which is formed separately, the scan line driver circuit 4004, or the pixel portion 4002.

Further, since the transistor is easily broken by static electricity and the like, a protection circuit for protecting the driver circuits is preferably provided over the same substrate for a gate line or a source line. The protection circuit is preferably formed using a nonlinear element in which an oxide semiconductor is used.

In FIGS. 6A1 and 6A2 and FIG. 6B, a connection terminal electrode 4015 is formed using the same conductive film as the pixel electrode layer 4030, and a terminal electrode 4016 is formed using the same conductive film as the source and drain electrode layers of the transistors 4010 and 4011.

The connection terminal electrode 4015 is electrically connected to a terminal included in the FPC 4018 through an anisotropic conductive film 4019.

Although FIGS. 6A1 and 6A2 and FIG. 6B illustrate an example in which the signal line driver circuit 4003 is formed separately and mounted on the first substrate 4001, this embodiment is not limited to such a structure. The scan line driver circuit may be formed separately and then mounted, or only part of the signal line driver circuit or part of the scan line driver circuit may be formed separately and then mounted.

Figure 7:
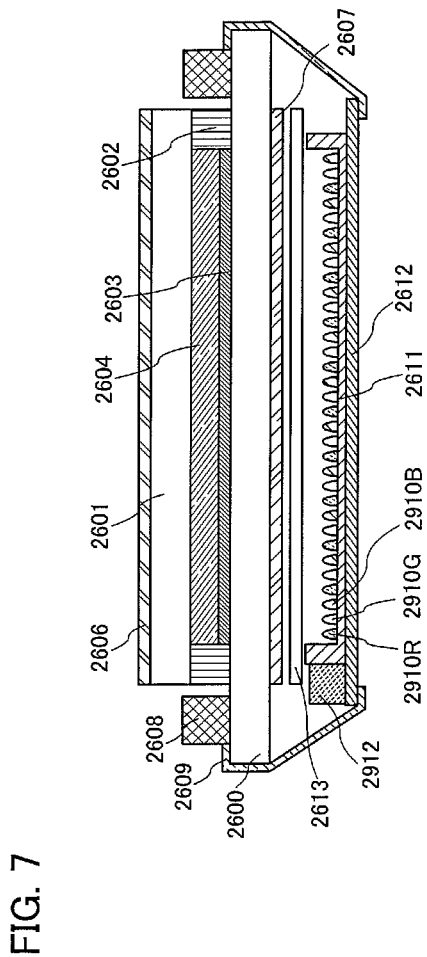
FIG. 7 is a view illustrating an example of a structure of a liquid crystal display device.

FIG. 7 illustrates an example of a cross-sectional structure of a liquid crystal display device in which an element substrate 2600 and a counter substrate 2601 are attached to each other with a sealant 2602, and an element layer 2603 including a transistor or the like and a liquid crystal layer 2604 are provided between the substrates.

In the case where color display is performed, light-emitting diodes which emit light of plural colors are arranged in a backlight portion. In the case of an RGB mode, a red light-emitting diode 2910R, a green light-emitting diode 2910G, and a blue light-emitting diode 2910B are disposed in each of a plurality of regions into which a display area of the liquid crystal display device is divided.

A polarizing plate 2606 is provided on the outer side of the counter substrate 2601, and a polarizing plate 2607 and an optical sheet 2613 are provided on the outer side of the element substrate 2600. A light source is formed using the red light-emitting diode 2910R, the green light-emitting diode 2910G, the blue light-emitting diode 2910B, and a reflective plate 2611. An LED control circuit 2912 provided over a circuit substrate 2612 is connected to a wiring circuit portion 2608 provided over the element substrate 2600 through a flexible wiring board 2609 and further provided with an external circuit such as a control circuit or a power source circuit.

The LEDs are individually made to emit light by the LED control circuit 2912; thus, a field-sequential liquid crystal display device can be realized.

This embodiment can be implemented in combination with any of the structures described in the other embodiments as appropriate.

Embodiment 5

A liquid crystal display device disclosed in this specification can be applied to a variety of electronic devices (including a game machine). Examples of electronic devices include television sets (also referred to as televisions or television receivers), monitors of computers or the like, cameras such as digital cameras or digital video cameras, digital photo frames, mobile phones (also referred to as cellular phones or mobile phone sets), portable game consoles, portable information terminals, audio reproducing devices, large-sized game machines such as pachinko machines, and the like.

Figure 8:
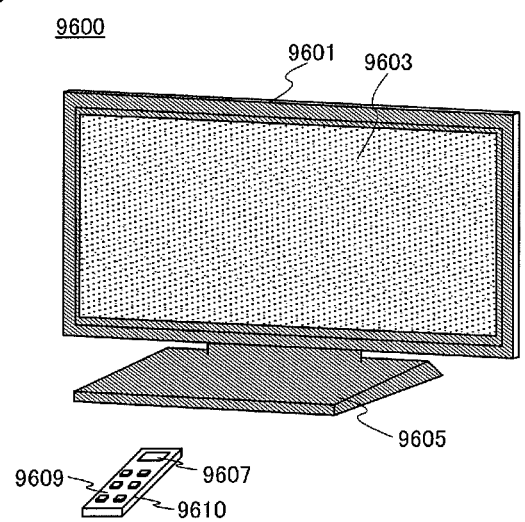
FIG. 8 is a view illustrating an example of application of a liquid crystal display device.

FIG. 8 illustrates an example of a television set 9600. In the television set 9600, a display portion 9603 is incorporated in a housing 9601. Images can be displayed on the display portion 9603. Here, the housing 9601 is supported by a stand 9605.

The television set 9600 can be operated with an operation switch of the housing 9601 or a separate remote controller 9610. Channels and volume can be controlled with operation keys 9609 of the remote controller 9610 so that an image displayed on the display portion 9603 can be controlled. Moreover, the remote controller 9610 may be provided with a display portion 9607 for displaying data output from the remote controller 9610.

Note that the television set 9600 is provided with a receiver, a modem, and the like. With the use of the receiver, general television broadcasting can be received. Moreover, when the television set 9600 is connected to a communication network by wired or wireless connection via the modem, one-way (from a transmitter to a receiver) or two-way (between a transmitter and a receiver, between receivers, or the like) data communication can be performed.

Figure 9A:
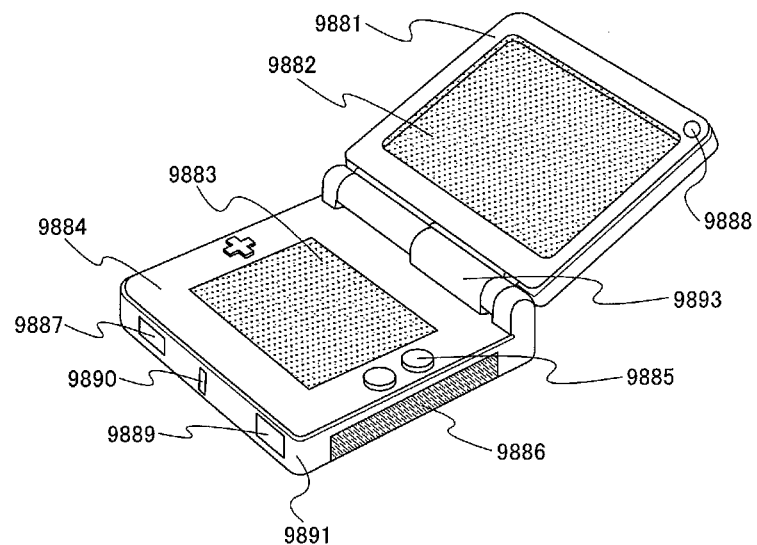
FIGS. 9A and 9B are views illustrating examples of application of liquid crystal display devices.

FIG. 9A illustrates a portable game machine including a housing 9881 and a housing 9891 which are jointed with a connector 9893 so as to be able to open and close. A display portion 9882 and a display portion 9883 are incorporated in the housing 9881 and the housing 9891, respectively. The portable game machine illustrated in FIG. 9A additionally includes a speaker portion 9884, a storage medium insertion portion 9886, an LED lamp 9890, an input means (operation keys 9885, a connection terminal 9887, a sensor 9888 (a sensor having a function of measuring force, displacement, position, speed, acceleration, angular speed, the number of rotations, distance, light, liquid, magnetism, temperature, chemical substance, sound, time, hardness, electric field, current, voltage, electric power, radiation; flow rate, humidity, tilt angle, vibration, smell, or infrared ray), a microphone 9889), and the like. It is needless to say that the structure of the portable game machine is not limited to the above structure and other structures provided with at least a liquid crystal display device disclosed in this specification may be employed. The portable game machine may include other accessory equipments as appropriate. The portable game machine illustrated in FIG. 9A has a function of reading out a program or data stored in a storage medium to display it on the display portion, and a function of sharing information with another portable game machine by wireless communication. The portable game machine in FIG. 9A can have various functions without limitation to the above.

Figure 9B:
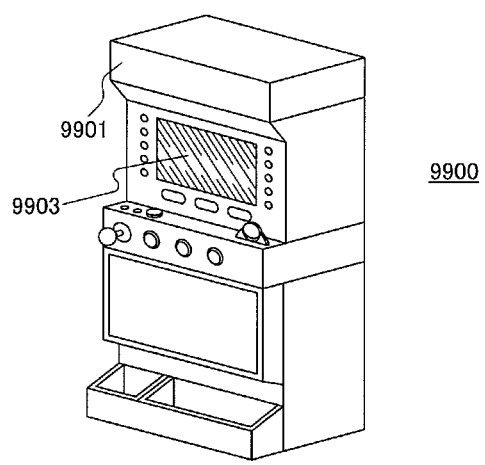

FIG. 9B illustrates an example of a slot machine 9900 which is a large-sized game machine. In the slot machine 9900, a display portion 9903 is incorporated in a housing 9901. In addition, the slot machine 9900 further includes an operation means such as a start lever or a stop switch, a coin slot, a speaker, and the like. It is needless to say that the structure of the slot machine 9900 is not limited to the above structure, and another structure provided with at least the liquid crystal display device disclosed in this specification may be employed. The slot machine may include another accessory equipment as appropriate.

Figure 10A:
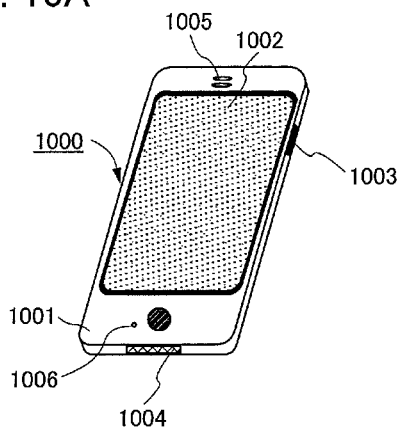
FIGS. 10A and 10B are views illustrating examples of application of liquid crystal display devices.

FIG. 10A illustrates an example of a mobile phone 1000. The mobile phone 1000 is provided with a display portion 1002 incorporated in a housing 1001, operation buttons 1003, an external connection port 1004, a speaker 1005, a microphone 1006, and the like.

When the display portion 1002 of the mobile phone 1000 illustrated in FIG. 10A is touched with a finger or the like, data can be input into the mobile phone 1000. Furthermore, operations such as making calls and composing mails can be performed by touching the display portion 1002 with a finger or the like.

There are mainly three screen modes of the display portion 1002. The first mode is a display mode mainly for displaying an image. The second mode is an input mode mainly for inputting information such as text. The third mode is a display-and-input mode in which two modes of the display mode and the input mode are mixed.

For example, in the case of making a call or composing a mail, a text input mode mainly for inputting text is selected for the display portion 1002 so that text displayed on a screen can be input. In this case, it is preferable to display a keyboard or number buttons on almost all the area of the screen of the display portion 1002.

When a detection device including a sensor for detecting inclination, such as a gyroscope or an acceleration sensor, is provided inside the mobile phone 1000, display on the screen of the display portion 1002 can be automatically switched by determining the direction of the mobile phone 1000 (whether the mobile phone 1000 is placed horizontally or vertically).

The screen mode is switched by touching the display portion 1002 or operating the operation buttons 1003 of the housing 1001. Alternatively, the screen mode can be switched depending on the kind of images displayed on the display portion 1002. For example, when a signal of an image displayed on the display portion is moving image data, the screen mode is switched to the display mode. When the signal is text data, the screen mode is switched to the input mode.

Furthermore, in the input mode, when input by touching the display portion 1002 is not performed for a certain period while a signal is detected by the optical sensor in the display portion 1002, the screen mode may be controlled so as to be switched from the input mode to the display mode.

The display portion 1002 can also function as an image sensor. For example, an image of a palm print, a fingerprint, or the like is taken by touching the display portion 1002 with the palm or the finger, whereby personal authentication can be performed. Furthermore, by providing a backlight or a sensing light source emitting a near-infrared light for the display portion, an image of a finger vein, a palm vein, or the like can also be taken.

Figure 10B:
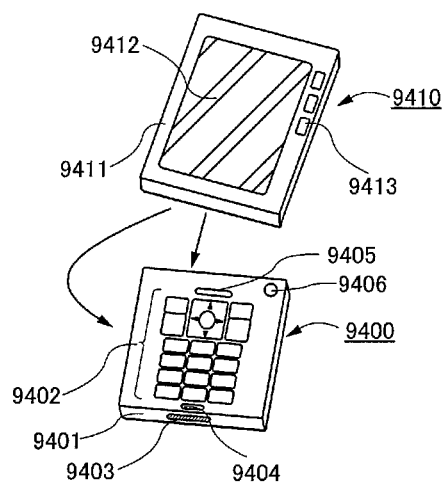

FIG. 10B also illustrates an example of a mobile phone. The mobile phone illustrated in FIG. 10B includes a display device 9410 having a display portion 9412 and operation buttons 9413 in a housing 9411 and a communication device 9400 having operation buttons 9402, an external input terminal 9403, a microphone 9404, a speaker 9405, and a light-emitting portion 9406 which emits light when receiving a call in a housing 9401. The display device 9410 having a display function can be detached from or attached to the communication device 9400 having a telephone function in two directions indicated by the arrows. Accordingly, the display device 9410 and the communication device 9400 can be attached to each other along their short sides or long sides. In addition, when only the display function is needed, the display device 9410 can be detached from the communication device 9400 and used alone. Images or input information can be transmitted or received by wireless or wired communication between the communication device 9400 and the display device 9410, each of which has a rechargeable battery.

Example 1

In this example, a case where a liquid crystal display device is manufactured using a liquid crystal dropping method is described.

Figure 11A:
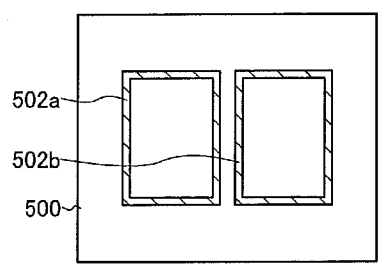
FIGS. 11A to 11F are views illustrating an example of a method for manufacturing liquid crystal display devices.
Figure 11D:
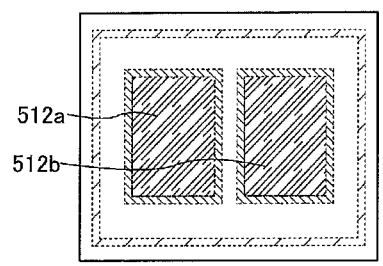

First, spacers each having a diameter of 4 µm were dispersed over a 5-inch glass substrate 500 (EAGLE 2000™ manufactured by Corning Incorporated), and then thermosetting first sealants 502a and 502b were formed (see FIG. 11A). The thermosetting first sealants 502a and 502b were each formed to have a rectangular shape of 4 cm by 3 cm.

The thermosetting first sealants 502a and 502b were formed using an epoxy resin with a viscosity of 30 Pa·sec (at 25° C.).

Next, the glass substrate 500 over which the first sealants 502a and 502b are formed were subjected to heat treatment to be pre-cured. The first sealants 502a and 502b were subjected to the heat treatment in an oven at 90° C. for three hours.

Then, the glass substrate 500 was taken out from the oven and then cooled to the room temperature (25° C.). After that, a photocurable and thermosetting second sealant 504 was formed so as to surround the first sealants 502a and 502b. The photocurable and thermosetting second sealant 504 was formed to have an 11-cm-square shape.

The photocurable and thermosetting second sealant 504 was formed using a resin which has a viscosity of 300 Pa·sec (at 25° C.) and includes an acrylic-based resin, an epoxy-based resin, a UV initiator, a thermosetting agent, or a coupling agent.

Figure 11B:
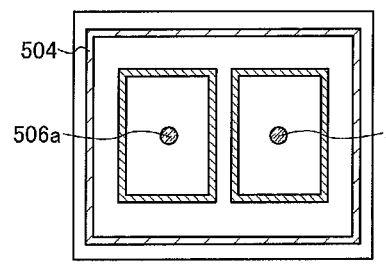

Next, liquid crystal materials 506a and 506b were dropped on the inner side than the first sealants 502a and 502b, respectively, over the glass substrate 500 (see FIG. 11B). The liquid crystal materials 506a and 506 each include commercially available materials shown in Table 1.

[Table 1]

TABLE 1

| material | | proportion (wt %) |
|---|---|---|
| liquid crystal | JC-1041XX (produced by Chisso Corporation) | 44.9 |
| liquid crystal | 4-cyano-4'-pentylbiphenyl (produced by Tokyo Chemical Industry Co., Ltd.) | 34.6 |
| chiral agent | S-1011(produced by Merck Ltd.) | 10.3 |
| ultraviolet curable resin | RM257 (produced by Merck Ltd.) | 5.0 |

TABLE 1-continued

| material | | proportion (wt %) |
|---|---|---|
| ultraviolet curable resin | trimethylolpropane triacrylate (produced byTokyo Chemical Industry Co., Ltd.) | 5.0 |
| photopolymerization initiator | 2,2-dimethoxy-2-phenylacetophenone (produced by Tokyo Chemical Industry Co., Ltd.) | 0.2 |

In this case, the temperature of the liquid crystal material was set to 80° C. at which the liquid crystal material exhibits an isotropic phase, and 4.8-mg droplets of the liquid crystal materials 506a and 506b were dropped on the inner side than the first sealants 502a and 502b, respectively.

Figure 11E:
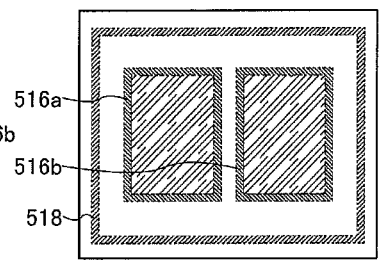
Figure 11C:
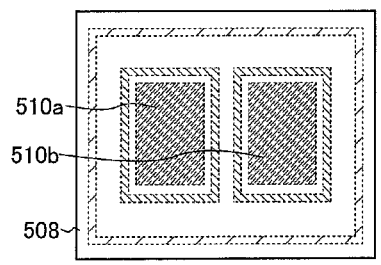

Then, a glass substrate 508 (EAGLE 2000™ manufactured by Corning Incorporated) was attached to the glass substrate 500. Here, the glass substrate 508 was fixed to an upper side of a chamber with an electrostatic chuck, and the glass substrate 500 on which the liquid crystal material is dropped was placed on a lower side of the chamber. Then, the pressure inside the chamber was reduced to 100 Pa, and the glass substrate 500 and the glass substrate 508 were attached to each other. After that, the chamber was exposed to the atmosphere (see FIG. 11C).

The distance between the glass substrate 500 and the glass substrate 508 was approximately 4 µm at this time. The liquid crystal materials 506a and 506b spread over approximately 90 percent of surfaces on the inner side than the first sealants 502a and 502b, respectively, and liquid crystal layers 510a and 510b were formed.

Next, the liquid crystal layers 510a and 510b were subjected to polymer stabilization treatment to form liquid crystal layers 512a and 512b (see FIG. 1 ID). The polymer stabilization treatment was performed in such a manner that after the liquid crystal layers 510a and 510b were heated to 50° C., the temperature was decreased by one degree per minute from 50° C. in order that a phase may transfer from an isotropic phase to a blue phase, and then irradiation with ultraviolet rays (1.5 mW/cm$^2$) with a main wavelength of 365 nm was performed for 30 minutes while the temperature was kept at 36° C. at which the blue phase spreads over the entire surface. In addition, through the heat treatment in the polymer stabilization treatment, the liquid crystal layers 510a and 510b spread over the entire surfaces on the inner side than the first sealants 502a and 502b, respectively.

Figure 11F:
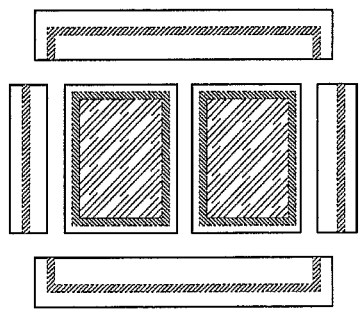
Figure 13A:
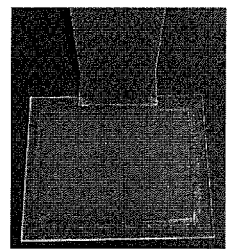
FIGS. 13A and 13B are views illustrating an example of a method for manufacturing a liquid crystal display device.
Figure 13B:
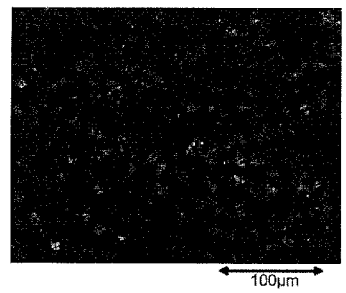

Then, heat treatment was performed to cure the thermosetting first sealants 502a and 502b. As a result, post-cured first sealants 516a and 516b and a post-cured second sealant 518 were obtained (see FIG. 11E). After that, the glass substrate 500 and the glass substrate 508 were cut (see FIG. 11F) and the separated panels were each provided with an FPC or the like, whereby a liquid crystal display device was manufactured. FIG. 13A is a photograph showing an appearance of an FPC in a state just after attachment. Note that in this example, the phases of the liquid crystal layers 512a and 512b transferred to an isotropic phase once through the heat treatment for post-curing. However, as shown in a photograph of FIG. 13B, which is taken with a polarizing microscope (which is taken under crossed nicols with a reflective polarizing microscope of 200 magnifications), it was confirmed that even in the case where the phases of the entire surfaces of the liquid crystal layers transferred to an isotropic phase once through the heat treatment for post-curing after the polymer stabilization treatment, the liquid crystal layers 512a and 512b each kept exhibiting a blue phase when the liquid crystal layers 512a and 512b were cooled to the room temperature (25° C.).

Example 2

In this example, a case where a liquid crystal display device is manufactured using a photocurable and thermosetting resin as a sealant is described.

Figure 12A:
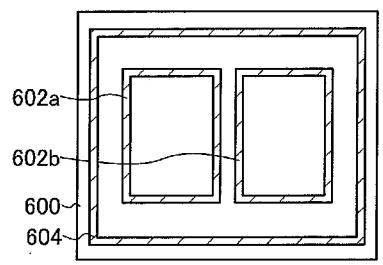
FIGS. 12A to 12G are views illustrating an example of a method for manufacturing liquid crystal display devices.

First, spacers each having a diameter of 4 µm were dispersed over a 5-inch glass substrate 600 (EAGLE 2000™ manufactured by Corning Incorporated), and then photocurable and thermosetting sealants 602a, 602b, and 604 were formed (see FIG. 12A). The photocurable and thermosetting sealants 602a and 602b were each formed to have a rectangular shape of 4 cm by 3 cm. The photocurable and thermosetting sealant 604 was formed to have an 11-cm-square shape.

The photocurable and thermosetting sealants 602a, 602b, and 604 were formed using a resin which has a viscosity of 300 Pa·sec (at 25° C.) and includes an acrylic-based resin, an epoxy-based resin, a UV initiator, a thermosetting agent, and a coupling agent.

Next, the glass substrate 600 over which the sealants 602a, 602b, and 604 are formed were irradiated with ultraviolet rays to be pre-cured. As a result, pre-cured sealants 603a, 603b, and 605 were obtained (see FIG. 12B). Irradiation with ultraviolet rays of 13 mW/cm$^2$ with a wavelength of 365 nm was performed using a Deep UV lamp with a main wavelength of 250 nm to 400 nm for 0.2 seconds.

Figure 12E:
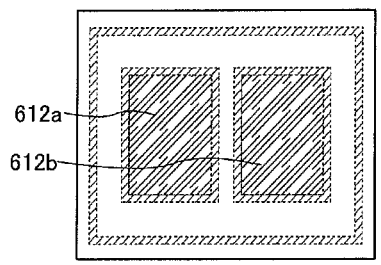
Figure 12B:
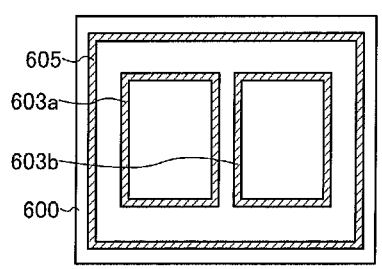
Figure 12F:
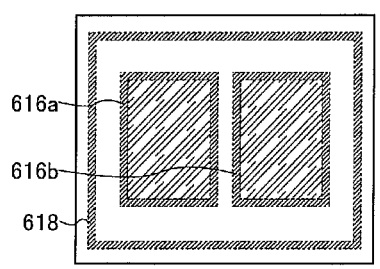
Figure 12C:
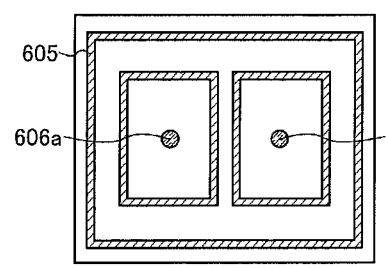

Next, one droplet of liquid crystal materials 606a and 606b was dropped on the inner side than the sealants 603a and 603b, respectively, over the glass substrate 600 (see FIG. 12C). Note that the liquid crystal materials 606a and 606b each include commercially available materials which are similar to those shown in Table 1 of Example 1.

In this case, the temperature of the liquid crystal material was set to 80° C. at which the liquid crystal material exhibits an isotropic phase, and one droplet (4.8 mg) of the liquid crystal materials 606a and 606b was dropped on the inner side than the sealants 603a and 603b, respectively.

Note that in the case of a panel, a plurality of droplets of the liquid crystal materials is preferably dropped at a plurality of portions because the liquid crystal materials spread uniformly over a panel surface. Therefore, polymer stabilization treatment can be performed more uniformly on the liquid crystal layers and generation of defects can be prevented when an image is displayed.

Figure 12G:
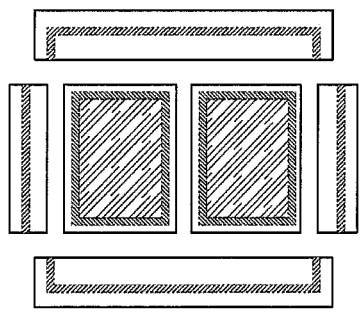
Figure 12D:
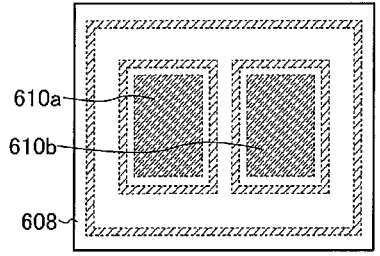

Then, a glass substrate 608 (EAGLE 2000™ manufactured by Corning Incorporated) was attached to the glass substrate 600. Here, the glass substrate 608 was fixed to an upper side of a chamber with an electrostatic chuck, and the glass substrate 600 on which the liquid crystal material is dropped was placed on a lower side of the chamber. Then, the pressure inside the chamber was reduced to 100 Pa, and the glass substrate 600 and the glass substrate 608 were attached to each other. After that, the chamber was exposed to the atmosphere (see FIG. 12D).

The distance between the glass substrate 600 and the glass substrate 608 was approximately 4 µm at this time. The liquid crystal materials 606a and 606b spread over approximately 90 percent of surfaces on the inner side than the sealants 603a and 603b, respectively, and liquid crystal layers 610a and 610b were formed.

Next, the liquid crystal layers 610a and 610b were subjected to polymer stabilization treatment to form liquid crystal layers 612a and 612b (see FIG. 12E). The polymer stabilization treatment was performed in such a manner that after the liquid crystal layers 610a and 610b were heated to 50° C., the temperature was decreased by one degree per minute from 50° C. in order that a phase may transfer from an isotropic phase to a blue phase, and then irradiation with ultraviolet rays (1.5 mW/cm$^2$) with a main wavelength of 365 nm was performed for 30 minutes while the temperature was kept at 36° C. at which the blue phase spreads over the entire surface. In addition, through the heat treatment in the polymer stabilization treatment, the liquid crystal layers 610a and 610b spread over the entire surfaces on the inner side than the sealants 603a and 603b, respectively.

Next, irradiation with ultraviolet rays of 13 mW/cm$^2$ with a wavelength of 365 nm was performed for 60 seconds and then heat treatment was performed at 120° C. for 60 minutes in order to cure the photocurable and thermosetting sealants 603a, 603b, and 605. As a result, post-cured sealants 616a, 616b; and 618 were obtained (see FIG. 12F). After that, the glass substrate 600 and the glass substrate 608 were cut (see FIG. 12G) and the separated panels were each provided with an FPC or the like, whereby a liquid crystal display device was manufactured. Note that in this example, the phases of the liquid crystal layers 612a and 612b transferred to an isotropic phase once through the heat treatment for post-curing the photocurable and thermosetting sealants 603a, 603b, and 605. However, it was confirmed that even in the case where the phases of the entire surfaces of the liquid crystal layers transferred to an isotropic phase once through the heat treatment for post-curing after the polymer stabilization treatment, the liquid crystal layers 612a and 612b each kept exhibiting a blue phase when the liquid crystal layers 612a and 612b were cooled to the room temperature (25° C.).

This application is based on Japanese Patent Application serial no. 2009-131121 filed with Japan Patent Office on May 29, 2009, the entire contents of which are hereby incorporated by reference.

What is claimed is:

1. A method for manufacturing a liquid crystal display device, comprising the steps of:

forming a first sealant so as to form a frame over a first substrate;

forming a second sealant so as to form a frame over a second substrate;

after forming the first sealant, pre-curing the first sealant through a first heat treatment;

after pre-curing the first sealant, dropping a liquid crystal material on an inner side of the first sealant;

after dropping the liquid crystal material, attaching the second substrate to the first substrate in a reduced-pressure atmosphere with the first sealant, the second sealant and the liquid crystal material interposed therebetween so that the second sealant is outside of and apart from the first sealant, wherein the liquid crystal material is not in contact with the first sealant;

performing polymer stabilization treatment including a second heat treatment on the liquid crystal material interposed between the first substrate and the second substrate, wherein viscosity of each of the liquid crystal material and the second sealant is reduced by the second heat treatment, whereby the liquid crystal material spreads to be in contact with the first sealant and a width of the second sealant is increased, and wherein the polymer stabilization treatment is performed before the second sealant is pre-cured;

curing the first sealant through a third heat treatment; and cutting the first substrate and the second substrate between the first sealant and the second sealant, wherein the first sealant is a thermosetting sealant, and wherein the second sealant is a photocurable and thermosetting sealant.

2. The method for manufacturing a liquid crystal display device according to claim 1, wherein as the liquid crystal material, a material which exhibits a blue phase at a given temperature is used.

3. The method for manufacturing a liquid crystal display device according to claim 1, wherein the polymer stabilization treatment is performed in such a manner that the second heat treatment is performed so that a temperature of the liquid crystal material is set to a temperature at which the liquid crystal material exhibits a blue phase, and then the liquid crystal material is irradiated with ultraviolet rays.

4. The method for manufacturing a liquid crystal display device according to claim 1, wherein the polymer stabilization treatment is performed in such a manner that the second heat treatment is performed so that a temperature of the liquid crystal material is set to a temperature within +5° C. of a phase transition temperature between a blue phase and an isotropic phase, at which the liquid crystal material exhibits an isotropic phase, and then the liquid crystal material is irradiated with ultraviolet rays.

5. The method for manufacturing a liquid crystal display device according to claim 1, wherein the liquid crystal material includes a photocurable resin.

6. A method for manufacturing a liquid crystal display device, comprising the steps of:
forming a first sealant so as to form a frame over a first substrate;
forming a second sealant so as to form a frame over a second substrate;
after forming the first sealant, pre-curing the first sealant through a first heat treatment;
after pre-curing the first sealant, dropping a liquid crystal material on an inner side of the first sealant;
after dropping the liquid crystal material, attaching the second substrate to the first substrate in a reduced-pressure atmosphere with the first sealant, the second sealant and the liquid crystal material interposed therebetween so that the second sealant is outside of and apart from the first sealant, wherein the liquid crystal material is not in contact with the first sealant;
after attaching the second substrate to the first substrate, curing the first sealant through a second heat treatment, wherein viscosity of each of the liquid crystal material and the second sealant is reduced by the second heat treatment, whereby the liquid crystal material spreads to be in contact with the first sealant and a width of the second sealant is increased;
after curing the first sealant through the second heat treatment, performing polymer stabilization treatment on the liquid crystal material interposed between the first substrate and the second substrate, wherein the polymer stabilization treatment is performed before the second sealant is pre-cured; and
cutting the first substrate and the second substrate between the first sealant and the second sealant,
wherein the first sealant is a thermosetting sealant, and
wherein the second sealant is a photocurable and thermosetting sealant.

7. The method for manufacturing a liquid crystal display device according to claim 6, wherein as the liquid crystal material, a material which exhibits a blue phase at a given temperature is used.

8. The method for manufacturing a liquid crystal display device according to claim 6, wherein the polymer stabilization treatment is performed in such a manner that a third heat treatment is performed so that a temperature of the liquid crystal material is set to a temperature at which the liquid crystal material exhibits a blue phase, and then the liquid crystal material is irradiated with ultraviolet rays.

9. The method for manufacturing a liquid crystal display device according to claim 6, wherein the polymer stabilization treatment is performed in such a manner that a third heat treatment is performed so that a temperature of the liquid crystal material is set to a temperature within +5° C. of a phase transition temperature between a blue phase and an isotropic phase, at which the liquid crystal material exhibits an isotropic phase, and then the liquid crystal material is irradiated with ultraviolet rays.

10. The method for manufacturing a liquid crystal display device according to claim 6, wherein the liquid crystal material includes a photocurable resin.

11. A method for manufacturing a liquid crystal display device, comprising the steps of:
forming a first sealant so as to form a frame over a first substrate;
forming a second sealant on an outer side of the first sealant over the first substrate;
dropping a liquid crystal material on an inner side of the first sealant;
attaching a second substrate to the first substrate;
performing polymer stabilization treatment on the liquid crystal material; and
curing the first sealant through heat treatment,
wherein the first sealant is a thermosetting sealant,
wherein the second sealant is a photocurable and thermosetting sealant, and
wherein the polymer stabilization treatment is performed before the second sealant is pre-cured.

12. The method for manufacturing a liquid crystal display device according to claim 11, wherein as the liquid crystal material, a material which exhibits a blue phase at a given temperature is used.

13. The method for manufacturing a liquid crystal display device according to claim 11, wherein the polymer stabilization treatment is performed in such a manner that the heat treatment is performed so that a temperature of the liquid crystal material is set to a temperature at which the liquid crystal material exhibits a blue phase, and then the liquid crystal material is irradiated with ultraviolet rays.

14. The method for manufacturing a liquid crystal display device according to claim 11, wherein the polymer stabilization treatment is performed in such a manner that the heat treatment is performed so that a temperature of the liquid crystal material is set to a temperature within +5° C. of a phase transition temperature between a blue phase and an isotropic phase, at which the liquid crystal material exhibits an isotropic phase, and then the liquid crystal material is irradiated with ultraviolet rays.

* * * * *